United States Patent Office 3,795,666
Patented Mar. 5, 1974

3,795,666
METHOD OF SYNTHESIZING PEPTIDES IN THE PRESENCE OF A CARBODIIMIDE AND OF 3-HYDROXY - 4 - OXO - 3,4 - DIHYDRO - 1,2,3-BENZOTRIAZINE
Wolfgang Konig, Langenhain, Taunus, Rolf Geiger, Frankfurt am Main, and Erhard Wolf, Hofheim, Taunus, Germany, assignors to Farbwerke Hoechst Aktiengesellschaft vormals Meister Lucius & Bruning, Frankfurt am Main, Germany
No Drawing. Filed July 28, 1970, Ser. No. 59,005
Claims priority, application Germany, Aug. 1, 1969, P 19 39 187.8
Int. Cl. C07c 103/52; C07g 7/00; C08h 1/00
U.S. Cl. 260—112.5  5 Claims

ABSTRACT OF THE DISCLOSURE

Improved synthesis of peptides by the carbodiimide method in which an amino-protected amino acid or peptide having a reactive carboxy group is condensed with a carboxy-protected amino acid or peptide having a reactive amino group in the presence of 3-hydroxy-4-oxo-3,4-dihydro-1,2,3-benzotriazine as well as in the presence of a carbodiimide such as dicyclohexyl carbodiimide.

---

The present invention relates to methods of synthesizing peptides by condensation reactions proceeding in the presence of a carbodiimide and of 3-hydroxy-4-oxo-3,4-dihydro-1,2,3-benzotriazine.

The disadvantage in the known preparation of peptides by means of dicyclohexyl-carbodiimide [J. Am. Chem. Soc. 77, 1067 (1955)] is that a considerable degree of racemization occurs during linkage of the peptides [Chem. Ber. 99, 1451–1460 (1966)] and that N-acyl-ureas are formed which render impure the product of the synthesis and reduce the yield (cf. E. Schroder and K. Lubke, The Peptides, vol. II, pages 108–111, Academic Press, New York and London, 1965).

Additions of 1.1 to 2 equivalents of N-hydroxy-succinimide reduce racemization, in the racemization test according to F. Weygand et al. [Z. Naturf. 21b, 426–428 (1966)], to below 1% of D-compound and prevent the formation of N-acyl-urea. In a modified racemization test according to F. Weygand et al. [Z. Naturf. 23b, 279–281 (1968)], which takes into consideration the often considerable steric hindrance in the manufacture of peptides, it was found, however, that even the addition of hydroxysuccinimide cannot always prevent a strong degree of racemization (see Tables 3 and 4). Moreover, additions of N-hydroxy-succinimide provoke the formation of side-products. Thus, it is reported in Acta Chim. Hung. 44, 63–65 (1965) that N-hydroxy-succinimide itself reacts with dicyclo-carbodiimide and that sterically hindered N-acylpeptide - N - hydroxy-succinimide esters could not be prepared. A compound obtained from one mole of dicyclohexyl-carbodiimide and three moles of N-hydroxy-succinimide was later identified as succinimido-oxycarbonyl-β-alanine-N-hydroxy-succinimide ester (E. Bricas: Peptides, pages 156–157, North-Holland Publishing Comp. (1968). This compound reacts smoothly with amines to form urea derivatives of the β-alanine-amides [cf. also Z. Naturf. 23b, 1391 (1968)].

Now, we have found that, surprisingly, in the method using dicyclohexyl-carbodiimide an addition of 3-hydroxy-4 - oxo - 3,4 - dihydro - 1,2,3 - benzotriazine (HOOBT) can also reduce racemization to 1% or below 1% of D-compound (see Table 1) and prevents the formation of N-acyl-urea. In addition, no racemization could be observed in the already cited sensitive modified racemization test upon addition of 3-hydroxy-4-oxo-3,4-dihydro-1,2,3-benzotriazine, whereas with N-hydroxy-succinimide racemization could not be completely prevented in this test. 3-hydroxy-4-oxo-3,4-dihydro-1,2,3-benzotriazine shows a further advantage over N-hydroxy-succinimide in the activation of N-protected peptides. While N-hydroxy-succinimide esters can only be prepared with partial racemization, the preparation of the N - acyl - peptide - 3-hydroxy - 4-oxo-3,4-dihydro-1,2,3-benzotriazine esters succeeds without racemization (see Tables 2 and 4). These activated esters of the following Formula I are excellently suitable for the synthesis of peptides. In general, their isolation is not necessary for the synthesis of peptides.

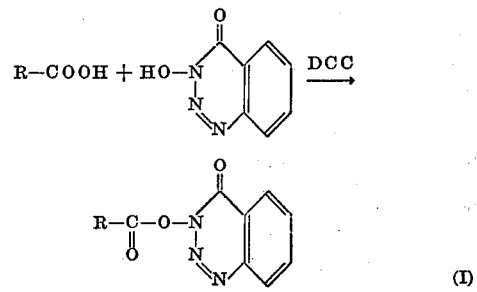

(I)

(IR: 1810–1815 cm.$^{-1}$).
(RCOOH=N-protected amino-acid or peptide).

These new activated esters react very rapidly, even under strong steric hindrance, with the primary or secondary amino-groups of the amino-acids or peptides which may also be protected.

By-products are not formed to the extent as when N-hydroxy-succinimide is used. Therefore, with 3-hydroxy-4 - oxo - 3,4 - dihydro - 1,2,3 - benzotriazine, the yields are generally higher and the compounds isolated are obtained in purer form.

Hence, the object of the present invention is a process for the manufacture of peptides, wherein (a) A protected amino-acid or a protected peptide in which the carboxyl group that shall enter into reaction is free, is reacted with an amino-acid ester or peptide ester or the amides thereof in which the amino group which shall enter into reaction is free, in a solvent usually employed in peptide chemistry, with the addition of 1–2, preferably 1, equivalent of 3-hydroxy-4-oxo-3,4-dihydro-1,2, 3-benzotriazine and a carbodiimide, or (b) A protected amino-acid or a protected peptide, in which the carboxyl group that shall enter into reaction is free, is reacted with 1–2 equivalents, preferably 1 equivalent, of 3 - hydroxy - 4 - oxo - 3,4-dihydro-1,2,3-benzotriazine and a carbodiimide to obtain an activated derivative and the latter is reacted with an amino-acid that may be protected or with a peptide that may be protected or with amides thereof, in which the amino group that shall enter into reaction is free, in a solvent usually employed in peptide chemistry, and when the reaction is complete, and after conventional purification, the protective groups are split off completely or partially, if desired.

As carbodiimides, the compounds usually employed in peptide chemistry, such as dicyclohexyl-carbodiimide, diisopropyl-carbodiimide and water-soluble carbodiimides such as N-cyclohexyl-N'-p-(diethylamino-cyclohexyl)-carbodiimides or N-cyclohexyl-N'-[β-(N-methyl-morpholinium)-ethyl]-carbodiimide p-toluenesulfonate, may be used. As protective groups for the functional group of the amino-acids and peptides which have to be protected, all protective groups employed in peptide chemistry are suitable. Even polymeric resins such as hydroxymethyl-polystyrene may be used as protective groups (E. Schroder, K. Lubke, The Peptides, vol. 1, pages 108–111, Academic Press, New York and London, 1965).

Suitable solvents that are usually employed in peptide chemistry are polar solvents, for example dimethylformamide, dimethylacetamide, tetrahydrofurane, dioxane, pyridine, dimethylsulfoxide, phosphoric acid tris-diethylamide or methylene chloride and, optionally, mixtures of these solvents. The reaction temperature is advantageously in the range of from $-20°$ to $+40°$ C., preferably at about $0°$ C.

In the case of peptides that are protected at the carboxyl group and are sparingly soluble in water, the 3-hydroxy-4-oxo-3,4-dihydro-1,2,3-benzotriazine added can be completely removed by shaking with sodium or potassium bicarbonate solution or with a soda solution. A particular advantage of this method is that the 3-hydroxy-4-oxo-3,4-dihydro-1,2,3-benzotriazine used can be precipitated by acidification of these sodium bicarbonate solutions. This is not possible with an addition of N-hydroxy-succinimide, for example, because N-hydroxy-succinimide dissolves also in acids. From sparingly soluble peptides, the 3-hydroxy-4-oxo-3,4-dihydro-1,2,3-benzotriazine can be extracted with isopropanal, ethanol, methanol, tetrahydrofurane or hot water.

In some cases the new activated esters have been isolated. In this respect it is of particular advantage that just the esters of Z-threonine and Z-serine, of which only a few crystallized activated esters are known up to date, can be isolated in good yields in crystalline form; it should be noted in this respect that serine and threonine peptides have hitherto been prepared by the azide method and that this azide method in most cases gives only moderate yields. As by-product, 4-Z-amino-oxazolidinone-2 is formed from the Z-serine-azide by way of the isocyanate, for example. If dicyclohexyl-carbodiimide is used alone, the corresponding N-acyl-ureas are formed as by-products (E. Schroder and K. Lubke, The Peptides, vol. I, page 208, Academic Press, New York and London 1965). The possibility of preparing Z-serine - 3 - hydroxy-4-oxo-3,4-dihydro-1,2,3-benzotriazine esters proves the high stability of the esters against alcoholysis.

Tyrosine peptides having an unprotected phenolic hydroxy group can also be prepared according to the dicyclohexyl-carbodiimide method with addition of 3- hydroxy-4-oxo-3,4-dihydro-1,2,3-benzotriazine.

If glutaminyl or asparaginyl peptides are prepared according to the dicyclohexyl-carbodiimide method, the corresponding nitriles are formed in considerable quantity by dehydration of the acid amide group. In the case of N-acyl-asparagine, imide-formation is also possible. Thus, asparaginyl peptides can only be prepared with yields of 39–45% (E. Schroder and K. Lubke, The Peptides, vol. I, pages 191 and 202–204 Academic Press, New York and London, 1965). If 3-hydroxy-4-oxo-3,4-dihydro-1,2,3-benzotriazine is added, glutaminyl and asparaginyl peptides can be prepared rapidly in pure form and with good yields.

As components of the peptides prepared according to the invention, all the amino-acids in their L- or D-form occurring in the peptides found in nature may be used. It is also possible to use β-amino-acids such as, for example β-alanine, or other amino-acids which are accessible only by synthesis or semi-synthesis, for example α-methyl-alanine, α-methyl-3,4-dihydroxy-L-phenyl-alanine or β-chloro-alanine.

After cleavage of the protective groups, the products of the invention may be used as therapeutic agents or as intermediates in the manufacture of other therapeutically valuable peptides such as, for example, oxytocin, vasopressin, glucagon, ACTH, secretin, thyrocalcitonin or insulin.

In the description and in the examples, the amino-acids have been designated by the internationally adopted abbreviations. In addition, the following abbreviations are used:

Z: carbobenzoxy-
Boc: tert.butyloxycarbonyl-
TFA: trifluoroacetyl-
OMe: methyl ester
ONB: p-nitrobenzyl ester
OBu$^t$: tert.butyl ester
OOBT: 3-hydroxy-4-oxo-3,4-dihydro-1,2,3-benzotriazine ester
HOOBT: 3-hydroxy-4-oxo-3,4-dihydro-1,2,3-benzotriazine
Mbh: 4,4'-dimethoxy-benzhydryl-
Trt: trityl-
MPCH: 1-(p-methoxy-phenyl)-cyclohexyl-
DMF: dimethylformamide
THF: tetrahydrofurane
DCHA: dicyclohexylamine
DCC: dicyclohexylcarbodiimide
TC: thin-layer chromatography The following examples illustrate the invention.

EXAMPLE 1

Preparation of isolated N-acyl-amino-acid-3-hydroxy-4-oxo-3,4-dihydro-1,2,3-benzotriazine esters (a) Z-Thr-OOBT: A solution of 11 g. of DCC in ice-cold tetrahydrofurane was added at $0°$ C. to a solution of 12.75 g. of Z-threonine (50 mmols) and 8.25 g. of HOOBT (50 mmols) in 150 ml. of absolute tetrahydrofurane. The mixture was stirred for 1 hour at $0°$ C. and for 1 hour at room temperature. The precipitate was filtered off with suction and the filtrate was concentrated under reduced pressure. The residue was triturated with isopropanol and filtered with suction. Recrystallization was possible from a mixture of tetrahydrofurane and petroleum ether. Yield: 16.57 g. (84.5% of the theory); melting point $170°$ C.; $[\alpha]_D = -26.6°$ (c.=2, in dimethylformamide).
$C_{19}H_{18}N_4O_6$ (398.4) Calc.: C, 57.28; H, 4.55; N, 14.07. Found: C, 57.1; H, 4.6; N, 14.4.

(b) Z-Ser-OOBT: 2.4 g. of Z-serine (10 mmols) were reacted as described in Example 1(a) with 1.65 g. of HOOBT (10 mmols). $[\alpha]_D = -40.4°$ (c.=2, in dimethylformamide): yield 3.25 g. (84.7% of the theory); melting point: 128–130° C.
$C_{18}H_{16}N_4O_6$ (384.4) Calc.: C, 56.25; H, 4.20; N, 14.58. Found: C, 56.1; H, 4.6; N, 14.9.

(c) Z-Asn(Mbh)-OOBT: 4.9 g. of Z-Asn(Mbh)-OH (10 mmols) were reacted as described in Example 1(a) with 1.65 g. of HOOBT (10 mmols) in dimethylformamide as the solvent. Yield: 3.1 g. (48.5% of the theory); melting point: 175–177° C.
$C_{34}H_{31}N_5O_8$ (637.65) Calc.: C, 64.05; H, 4.90; N, 10.98. Found: C, 64.2; H, 5.1; N, 11.1.

Preparation of the starting substance

Z-Asn(Mbh)-OH 0.5 ml. of concentrated sulfuric acid was added at room temperature to a solution of 27 g. of Z-Asn-OH and 24 g. of 4,4' - dimethoxy - benzhydrol in 250 ml. of glacial acetic acid. The whole was allowed to stand overnight and then poured into 750 ml. of water. The crystal magma that separated was filtered off with suction and dissolved in warm ethyl acetate. The ethyl acetate solution was extracted by shaking with water, dried over sodium sulfate and evaporated under reduced pressure. The residue was triturated with ether and filtered with suction. Yield: 47.5 g. (96%); melting point: 176–180° C.; $[\alpha]_D^{22} = +2.42°$ (c.=2, dimethylformamide).

EXAMPLE 2

(a) Z-Ser-Leu-OBu$^t$ (=Method a): 13 ml. N-ethyl-morpholine and an ice-cold solution of 22 g. of DCC in a small amount of dimethylformamide were added at 0° C. to a solution of 24 g. of Z-serine (0.1 mol), 22.5 g. of H-Leu-OBu$^t$.HCl and 16.3 g. of HOOBT in 300 ml. of dimethylformamide. The whole was stirred for one hour at 0° C. and for one hour at room temperature. The precipitate was filtered off with suction. The filtrate was concentrated under reduced pressure and the residue was taken up in ethyl acetate. The ethyl acetate solution was washed with saturated sodium bicarbonate solution, 2 N citric acid, saturated sodium bicarbonate solution and water, dried over sodium sulfate and concentrated under reduced pressure. The residue was dissolved in ether. Insoluble matter was filtered off and the ether was removed by distillation. The residue was crystallized from petroleum ether to which a small amount of ethyl acetate had been added. Yield: 36.5 g. (89.4%); melting point: 94–95° C., $[\alpha]_D = -36.05°$ (c.=2, in methanol).

$C_{21}H_{32}N_2O_6$ (408.5) Calc.: C, 61.74; H, 7.89, N, 6.86. Found: 61.7; H, 8.2; N, 7.0.

(b) Z-Ser-Leu-OBu$^t$ (with Z-Ser-OOBT): 0.65 ml. of N-ethyl-morpholine (5 mmols) and 1.95 g. of Z-Ser-OOBT (5 mmols) were added to a suspension of 1.15 g. of H-Leu-OBu$^t$.HCl (5 mmols) in tetrahydrofurane at 0° C. The whole was stirred for one hour at room temperature. The reaction mixture was concentrated. The residue was taken up in ethyl acetate and worked up as described under 2(a). Yield: 3.4 g. (83.3% of the theory); melting point: 93° C.

(c) Preparation of H-Leu-OB$^t$.HCl: 112 g. of Z-Leu-OBu$^t$ were hydrogenated catalytically in methanol with Pd-catalyst using an autotitrator at pH 4.5 (addition of 1 N-methanolic HCl). When the hydrogenation was completed, the catalyst was removed by filtration and the filtrate was concentrated under reduced pressure. The residue was triturated with ether. Yield 61.9 g.; melting point 171° C. The substance contained a small amount of leucine. After chromatography over neutral $Al_2O_3$ in methanol, the substance was chromatographically uniform. Yield 56.8 g.; melting point 172–173° C.

EXAMPLE 3

Preparation of Cys(Trt)-Ser-Leu (a) H-Ser-Leu-OBu$^t$.HCl: 39.4 g. of Z-Ser-Leu-OBu$^t$ were hydrogenated catalytically in methanol with Pd-catalyst using an autotitrator at pH 4.5 (addition of 1 N methanolic HCl). When the hydrogenation was completed, the catalyst was removed by filtration and the filtrate was concentrated under reduced pressure. The residue was saturated with ether. Yield 30 g. (=100% of the theory); melting point 196° C. After recrystallization from a mixture of methanol and ether, the compound was found to melt at 205° C. $[\alpha]_D = -35.3°$ (c.=2, in methanol).

$C_{13}H_{27}ClN_2O_4$ (310.8) Calc.: C, 50.21; H, 8.76; N, 9.02. Found: C, 50.0; H, 9.0; N, 9.1.

(b) Boc-Cys(Trt)-Ser-Leu-OBu$^t$: 4.7 g. of Boc-Cys(Trt)-OH (10 mmols) were dissolved in 30 ml. of absolute tetrahydrofurane. To this solution, there were added, at 0° C. 1.65 g. of HOOBT (10 mmols), 3.1 g. of H-Ser-Leu-OBu$^t$.HCl (10 mmols), 1.3 ml. of N-ethyl-morphline and, finally, while stirring, a solution of 2.2 g. of DCC in a small amount of tetrahydrofurane. The whole was stirred for one hour at 0° C. and for one hour at room temperature. It was then worked-up as described under 2(a). For purification, the oily residue was chromatographed in tetrahydrofurane over basic $Al_2O_3$ (Woelm, activity degree I). Yield 6.6 g. (amorphous foam) (91.8% of the theory). TC: uniform. $C_{40}H_{53}N_3O_7S$ (719.95).

(c) Cys(Trt)-Ser-Leu: 54.6 g. of Boc-Cys(Trt)-Ser-Leu-OBu$^t$ were dissolved at room temperature in trifluoro-acetate acid (anhydrous). The solution was allowed to stand for one hour at room temperature and concentrated under reduced pressure at a bath temperature of 25° C. The residue was distilled three times with ether and the final residue was dried under a high vacuum. The residue was then dissolved in ether and shaken with a saturated sodium acetate solution. The precipitate that separated was filtered off with suction, washed with water and dried. The amorphous powder was dissolved in tetrahydrofurane. Insoluble matter was filtered off and the peptide was again precipitated with the aid of petroleum ether. Yield 36.6 g. (82.6% of the theory), amorphous, TC: ninhydren-positive impurity. $[\alpha]_D = +9.95°$ (c.=2, in glacial acetic acid).

$C_{37}H_{37}N_3O_5S.1H_2O$ (581.7) Calc.: C, 64.00; H, 6.76; N, 7.23; S, 5.51. Found: C, 63.9; H, 6.8; N, 7.6; S, 5.5.

EXAMPLE 4

Preparation of Gly-Val-Cys(Trt)-Ser-Leu (a) Boc-Gly-Val-OH: 6.5 ml. of N-ethyl-morpholine (50 mmols) and finally a solution of 11 g. of DCC in a small amount of tetrahydrofurane were added, at 0° C., while stirring, to a suspension of 8.75 g. of Boc-glycine (50 mmols), 8.25 g. of HOOBT (50 mmols) and 8.5 g. of H-Val-OMe.HCl (50 mmols) in 150 ml. of tetrahydrofurane. The whole was stirred for 1 hour at 0° C. and for 1 hour at room temperature. The precipitate was filtered off with suction and the filtrate was concentrated. The whole was then worked up as described in Example 2(a). Yield 10.6 g. (oily). For purification, the product was chromatographed over basic $Al_2O_3$ (Woelm, activity degree I). Yield 8.7 g. (oily). The 8.7 g. of Boc-Gly-Val-OMe obtained were dissolved in 32 ml. of dioxane. The dioxane solution was at first combined with 4 ml. of water and then, within 1–2 hours, with 30.2 ml. of 1 N NaOH. After 2 hours, the whole was neutralized with 2 N citric acid and the reaction mixture was concentrated under reduced pressure. The residue was distributed between ethyl acetate and 2 N citric acid at 0° C. The ethyl acetate phase was extracted by shaking with 2 N citric acid and once with water, dried over sodium sulfate and concentrated. Yield 7.85 g. After recrystallization from a mixture of ethyl acetate and petroleum ether, the yield amounted to 6.5 g.; melting point 98–101° C.; $[\alpha]_D = +4.33°$ (c.=2, in methanol).

$C_{12}H_{22}N_2O_5$ (274.3) Calc.: C, 52.52; H, 8.08; N, 10.22. Found: C, 52.8; H, 8.1; N, 10.1.

(b) Boc-Gly-Val-Cys(Trt)-Ser-Leu-OH: A solution of 3.14 g. of Boc-Gly-Val-OH (11 mmols) and 1.82 g. of HOOBT (11 mmols) in 45 ml. of tetrahydrofurane was combined at 0° C. with 2.27 g. of DCC (11 mmols). The whole was stirred for 1 hour at 0° C. and for 1 hour at room temperature and then 5.8 g. of Cys(Trt)-Ser-Leu. 1 $H_2O$ (10 mmols) were added; the whole was further stirred for 1 hour at room temperature. The precipitate was filtered off with suction and the filtrate was concentrated. The residue was triturated with ether. An amorphous product was formed which was dissolved and recrystallized from a mixture of tetrahydrofurane and petroleum ether for purification. Yield 7.8 g. (93.1% of the theory). $[\alpha]_D = -11.55°$ (c.=2, dimethylformamide). TC: uniform.

$C_{43}H_{57}N_5O_9S.1H_2O$ (838.0) Calc.: C, 61.63; H, 7.10; N, 8.36; S, 3.83. Found: C, 61.5; H, 7.1; N, 8.3; S, 4.0.

(c) Gly-Val-Cys(Trt)-Ser-Leu: 7.3 g. of Boc-Gly-Val-Cys(Trt)Ser-Leu-OH were dissolved at room temperature in anhydrous trifluoro-acetic acid. The whole was allowed to stand for 30 minutes at room temperature and then concentrated under reduced pressure at a bath temperature of 25° C. The residue was saturated with ether and filtered off with suction. The amorphous product was dissolved in a mixture of dioxane and water (6:4) and precipitated with sodium acetate solution. The whole was cooled, filtered with suction and washed with water. Yield 6.75 g. (86.6% of the theory); $[\alpha]_D = -25.6°$ (c.=1, acetic acid having a strength of 90%). TC: contains traces of substances which are positive to ninhydrine, as impurity.

$C_{38}H_{49}N_5O_7S_2$·Na-acetate, 0.5 $H_2O$ (894.99 (Calc.: C, 56.35; H, 6.31; N, 7.83; S, 3.58; Na, 5.14. Found: C, 56.2; H, 6.4; N, 7.4; S, 3.3; Na, 4.6.

EXAMPLE 5

Preparation of Boc-Cys(Trt)-Cys(MPCH)-Ala-Gly-Val-Cys-(Trt)-Ser-Leu-OH (a) Boc-Cys(Trt)-Cys(MPCH)-Ala-ONB: 7.5 ml. of N-ethylmorpholine (58.5 mmols) and, after stirring for 5 minutes, 12.7 g. of DCC (61.3 mmols) dissolved in a small amount of tetrahydrofurane, were added at 0° C., while stirring, to a suspension of 23.7 g. of Boc-Cys-(MPCH)OH (57.9 mmols), 23.1 g. of H-Ala-ONB-tosylate (58.2 mmols) and 9.55 g. of HOOBT (58.5 mmols) in 230 ml. of tetrahydrofurane. The mixture was stirred for 1 hour at 0° C. and for 1 hour at room temperature. The precipitate was filtered off with suction and the filtrate was concentrated. The residue was worked-up as described in Example 2(a), and for further purification, chromatographed in ethyl acetate on basic $Al_2O_3$ (Woelm, activity degree 1). Yield 31.9 g. (89.5% of the theory), amorphous substance. The 37.9 g. of Boc-Cys (MPCH)-Ala-ONB (51.8 mmols) obtained were dissolved in 100 ml. of glacial acetic acid. Then, 100 ml. of 1 N HCl glacial acetic acid were added and the whole was allowed to stand for 1 hour at room temperature. The whole was concentrated under a high vacuum and distilled with ether. The residue was triturated several times with ether, while each time decanting the ether from the residue. Finally, the residue was dried under high vacuum. 24.3 g. of an amorphous foam remained behind. This corresponded to a yield of 85% of the theory, referred to Boc-Cys(MPCH)-Ala-ONB. The above-obtained 24.3 g. of H-Cys(MPCH)-Ala-ONB.HCl (44.1 mmols) were dissolved in a small amount of tetrahydrofurane and added to a reaction mixture of 23.2 g. of Boc-Cys(Trt)-OH (50 mmols), 7.3 g. of HOOBT (45 mmols) and 9.3 g. of DCC (45 mmols) in 100 ml. of tetrahydrofurane, which had been stirred for 1 hour at 0° C. and for 1 hour at room temperature. Then, 5.8 ml. N-ethylmorpholine (45 mmols) were added dropwise and the whole was further stirred for 1 hour at room temperature. The precipitate was filtered off with suction, the filtrate was concentrated under reduced pressure and the residue was worked-up as described in Example 2(a). For further purification, the product was chromatographed in ethyl acetate on basic $Al_2O_3$ (Woelm, activity degree I). Yield 40.9 g. of amorphous foam (96.4% of the theory, referred to H-Cys-(MPCH)-Ala-ONB.HCl). TC: uniform. $C_{53}H_{60}N_4O_9S_2$ (961.2).

(b) Boc-Cys(Trt)-Cys(MPCH) - Ala - OH: 40.9 g. of Boc-Cys(Trt)-Cys(MPCH)-Ala-ONB (42.5 mmols) were dissolved in 125 ml. of dioxane. 25 ml. of water were added, while stirring, and the whole was titrated with 43 ml. of 1N NaOH against thymolphthalein. As soon as hydrolysis was completed, neutralization was effected with 2 N citric acid and the reaction mixture was concentrated under reduced pressure. The residue was distributed at 0° C. between ethyl acetate and 2 N acetic acid. The ethyl acetate solution was washed with 2 N citric acid and water, dried over sodium sulfate and concentrated under reduced pressure. In order to separate the p-nitrobenzyl-alcohol, the whole layer was dissolved in a small amount of ether and an oil was rapidly precipitated with a larger amount of petroleum ether. The supernatant was rapidly decanted from the oil that had precipitated. This purification procedure was repeated twice. By the last solution and precipitation the substance was obtained in the form of an amorphous powder. Yield 22.6 g. (64.4% of the theory): TC: uniform. $C_{46}H_{55}N_3O_7S_2$ (826.1).

(c) Boc-Cys(Trt)-Cys(MPCH)-Ala-Gly - Val - Cys-(Trt)-Ser-Leu-OH: A solution of 1.75 g. of DCC (8.45 mmols) in a small amount of dimethylformamide which had been cooled to 0° C. was added to a solution of 6.98 g. of Boc-Cys-(Trt)-Cys(MPCH)-Ala-OH (8.45 mmols) and 1.15 g. of HOOBT (8.45 mmols) in 30 ml. of dimethylformamide, at 0° C. The whole was stirred for 1 hour at 0° C. and for 1 hour at room temperature and then 5.8 g. of Gly-Val-Cys(Trt)-Ser-Leu, 2 g. of sodium acetate, and 0.5 ml. $H_2O$ (6.5 mmols) were added. Stirring was continued for a further hour at room temperature. The precipitate was filtered off with suction, concentrated under reduced pressure and the residue was triturated with ether. The amorphous powder formed was filtered off with suction and dissolved and reprecipitated from a mixture of glacial acetic acid and water. Yield: 9.8 g. (97.7% of the theory). The substance had no sharp melting point. TC: uniform. $[\alpha]_D = -14.3°$ (c.=2, in dimethylformamide).

$C_{84}H_{102}N_8O_{12}S_3$·1 $H_2O$ (1546) Calc.: C, 65.27; H, 6.78; N, 7.24; S, 6.23. Found: C, 65.1; H, 6.9; N, 7.1; S, 6.6.

EXAMPLE 6

Preparation of Z-Val-Glu(OBu$^t$)-Gln(Mbh)-OMe (a) Z-Glu(OBu$^t$)-Gln(Mbh)-OMe: 5.2 g. of Z-Glu-(OBu$^t$)-OH·DCHA (10 mmols) and 4.25 g. of H-Gln-(Mbh)-OMe·HCl (10 mmols) were dissolved separately in 20 ml. of dimethylformamide each and then combined. The whole was well cooled. The precipitate that separated was filtered off and the filtrate was combined with 1.65 g. of HOOBT (10 mmols). The solution was combined at 0° C. with a solution of 2.2 g. of DCC in dimethylformamide and was stirred for 1 hour at 0° C. and for 1 hour at room temperature. The precipitate was filtered off with suction and the filtrate was combined with water. The precipitate that separated was dissolved in ethyl acetate and extracted by shaking as described in Example 2(a). The residue was saturated with petroleum ether. Yield: 5.5 g. (78% of the theory): melting point 171–173° C. $[\alpha]_D = -6.49°$ (c.=2, in dimethylformamide).

$C_{38}H_{47}N_3O_{10}$ (705.8) Calc.: C, 64.66; H, 6.71; N, 5.96. Found: C, 64.2; H, 6.9; N, 6.1.

Preparation of the starting compounds

Z-Gln(Mbh)-OH: 28 g. of Z-Gln-OH and 24 g. of 4.4'-dimethoxybenzhydrol were dissolved in 250 ml. of glacial acetic acid. 0.5 ml. of concentrated sulfuric acid was added at room temperature. The whole was allowed to stand overnight and then poured into 750 ml. of water. An oil separated which soon crystallized. The crystal magma was filtered off with suction and dissolved in warm ethyl acetate. The ethyl acetate was extracted by shaking with water, dried over sodium sulfate and concentrated. The residue was saturated with ether and filtered with suction. The product was then dissolved and precipitated from a mixture of tetrahydrofurane and petroleum ether. Yield 45.8 g. (90%); melting point 117–120° C. $[\alpha]_D^{22} = -6.75°$ (c.=2, dimethylformamide).

Z-Gln(Mbh)-OMe: 5.1 g. of Z-Gln(Mbh)-OH were dissolved in tetrahydrofurane. An ethereal diazomethane solution was added dropwise at room temperature until the yellow color remained. Excess diazomethane was destroyed with a few drops of glacial acetic acid. The solvent was eliminated under reduced pressure and the residue was triturated with petroleum ether. Yield: 5.2 g. (100%); melting point 146–150° C. $[\alpha]_D^{22} = -10.8°$ (c.=2, dimethylformamide).

HCl·H-Gln(Mbh)-OMe: 56 g. of Z-Gln(Mbh)-OMe were dissolved in methanol to which a small amount of dimethylformamide had been added. After addition of Pd-catalyst, hydrogenation was effected during which process the pH was kept at 4.5 by dropwise addition of 1 N-methanolic hydrochloric acid by means of an autotitrator. After hydrogenation, the catalyst was filtered off with suction and the filtrate was concentrated under reduced pressure. The residue was dissolved in methanol and chromatographed through a neutral $Al_2O_3$ column (Woelm, activity degree I). Yield: 34.5 g. (76%); melting point 182–183° C.; $[\alpha]_D^{22}= +21.4°$ (c.=2, methanol).

(b) Z-Val-Glu(OBu$^t$)-Gln(Mbh)-OMe: 4 g. of Z-Glu-(OBu$^t$)-Gln(Mbh)-OMe were hydrogenated catalytically in a mixture of methanol and dimethylformamide with Pd-catalyst using an autotitrator, at pH 4.5 (addition of 1 N methanolic HCl). When the hydrogenation was complete, the catalyst was removed by filtration and the filtrate was concentrated under reduced pressure. The residue was triturated with petroleum ether and ether and dried under a high vacuum. The residue was dissolved with 1.4 g. of Z-valine and 0.92 g. of HOOBT in 17 ml. of dimethylformamide and then combined, at 0° C., while stirring, with 0.73 ml. of N-ethylmorpholine and a cold solution of 1.25 g. of DCC in dimethylformamide. The whole was stirred for 1 hour at 0° C. and for 1 hour at room temperature. The precipitate was filtered off with suction and the filtrate was concentrated. The residue was saturated twice with a sodium bicarbonate solution and washed with water. Yield: 4.35 g. (95.3% of the theory); melting point 189–190° C. For purification, the product was boiled up with alcohol and cooled; yield 3.85 g. (84.4% of the theory); melting point 200–204° C. $[\alpha]_D= -9.45°$ (c.=2, in dimethylformamide).

$C_{43}H_{56}N_4O_{11}$ (804.95) Calc.: C, 64.16; H, 7.01; N, 6.96. Found: C, 64.0; H, 7.0; N, 6.9.

EXAMPLE 7

Preparation of Z-Pro-Lys(Boc)-Gly-NH-Mbh (a) Z-Lys(Boc)-Gly-NH-Mbh: 56.2 g. of Z-Lys(Boc)-OH.DCHA (0.1 mol) and 34 g. of H-Gly-NH-Mbh.HCl (0.1 mol) were dissolved separately in 200 ml. of dimethylformamide each and then combined. The whole was cooled. The precipitate that separated was filtered off with suction and then the filtrate was combined with 16.3 g. of HOOBT (0.1 mol). The solution was combined at 0° C. with a solution of 22 g. of DCC in dimethylformamide. The whole was stirred for 1 hour at 0° C. and for 1 hour at room temperature. The precipitate was filtered off with suction and the filtrate was concentrated under a high vacuum. The residue was distributed between warm ethyl acetate and sodium bicarbonate solution. The ethyl acetate phase was washed with 2 N citric acid, sodium bicarbonate solution and water, dried over sodium sulfate and concentrated. The residue was recrystallized from a mixture of ethyl acetate and petroleum ether. Yield: 54.2 g. (82% of the theory); melting point 125–127° C.; $[\alpha]_D= +5.4°$ (c.=2, in methanol).

$C_{36}H_{46}N_4O_8$ (662.8) Calc.: C, 65.24; H, 7.00; N, 8.45. Found: C, 65.1; H, 6.8; N, 8.2.

(b) H-Lys(Boc)-Gly-NH-Mbh·HCl: 54.2 g. of Z-Lys(Boc)-Gly-NH-Mbh were suspended in methanol, combined with palladium-catalyst and hydrogenated catalytically while adding dropwise 1 N methanolic hydrochloric acid (autotitrator, pH 5). The catalyst was removed by filtration with suction and the solution was concentrated. The residue was triturated with ether. Yield: 45.1 g. (97.5% of the theory); melting point 196° C.; $[\alpha]_D= +16.75°$ (c.=2, in methanol);

(565.1).

(c) Z-Pro-Lys(Boc)-Gly-NH-Mbh: A solution of 2.2 g. of DCC in a small amount of dimethylformamide which had been cooled to 0° C. was added, likewise at 0° C., to a solution of 2.5 g. of Z-proline (10 mmols) and 1.63 g. of HOOBT (10 mmols) in 30 ml. of dimethylformamide. The whole was allowed to stand for 1 hour at 0° C. and for 1 hour at room temperature and then 5.65 g. of finely pulverized H-Lys(Boc)-Gly-NH-Mbh·HCl (10 mmols) and 1.3 ml. of N-ethylmorpholine (10 mmols) were added. The whole was stirred for 1 hour at room temperature. The precipitate that separated was filtered off with suction and the filtrate was concentrated. The product was worked-up as described under 7(a). Yield: 7.2 g. (98% of the theory); melting point 180–183°; $[\alpha]_D= -25°$ (c.=2, in dimethylformamide).

(d) H-Gly-NH-Mbh·HCl: 44.7 g. of Z-Gly-NH-Mbh were suspended in a mixture of 300 ml. of methanol and 300 ml. of glacial acetic acid and hydrogenated catalytically with palladium-catalyst. The catalyst was removed by filtration with suction and the filtrate was concentrated. The residue was dissolved in methanol and titrated with methanolic hydrochloric acid against thymol blue. The whole was again concentrated and the residue was triturated with ether. Yield: 33.9 g. (98% of the theory). After recrystallization from a mixture of methanol and ether, the compound was obtained in a yield of 31.7 g. (91.6% of the theory); melting point 202–204° C.

$C_{17}H_{21}ClN_2O_3$ (336.8) Calc. C, 60.61; H, 6.28; N, 8.32. Found. C, 60.3; H, 6.5; N, 8.4.

Preparation of the starting compound Z-Gly-NH-Mbh 2.1 g. of Z-Gly-NH$_2$ and 2.4 g. of 4,4'-dimethoxybenzhydrol were dissolved in 20 ml. of glacial acetic acid. One drop of concentrated sulfuric acid was added and the whole was allowed to stand overnight. The next day the mixture was diluted with 40 ml. of water, cooled and the crystal magma that separated was filtered off with suction. The filter residue was dissolved in ethyl acetate. The ethyl acetate solution was extracted with water, dried over sodium sulfate and concentrated. Yield: 3.6 g. (83%); melting point 148–150° C. (alcohol).

EXAMPLE 8

Z-Gln-Ala-OBu$^t$ (a) According to Method (a): 1.28 ml. of N-ethylmorpholine (10 mmols) and finally a cold solution of 2.1 g. of DCC in a small amount of dimethylformamide added at 0° C. to a solution of 2.8 g. of Z-Gln-OH (10 mmols), 1.8 g. of H-Ala-OBu$^t$·HCl (10 mmols) and 1.63 g. of HOOBT (10 mmols) in dimethylformamide. The whole was stirred for 1 hour at 0° C. and for 1 hour at room temperature. The precipitate was filtered off with suction and the filtrate was combined with water. The whole was allowed to stand overnight in a refrigerator and on the next day the precipitate was filtered off with suction, saturated with sodium bicarbonate solution and washed with water. It was then dried over phosphorus pentoxide. Yield: 2.8 g. (69% of the theory); melting point 158–160° C.

(b) With pre-activation: A cold solution of 2.1 g. of DCC in a small amount of dimethylformamide was added at 0° C. to a solution of 2.8 g. of Z-Gln-OH (10 mmols) and 1.63 g. of HOOBT (10 mmols) in 20 ml. of dimethylformamide. The whole was stirred for 1 hour at 0° C. and for 1 hour at room temperature and then 1.8 g. of H-Ala-OBu$^t$·HCl (10 mmols) and 1.28 ml. of N-ethylmorpholine were added. The mixture was further stirred for 1 hour at room temperature and worked-up as described under 8(a). Yield: 2.6 g. (63% of the theory); melting point 158–161° C.

EXAMPLE 9

Z-Tyr-Tyr-OMe 1.3 ml. of N-ethylmorpholine and solution of 2.2 g. of DCC in 5 ml. of methylene chloride were added at 0° C., while stirring, to a suspension of 3.15 g. of Z-Tyr-OH (10 mmols), 2.30 g. (10 mmols) of H-Tyr-OMe·HCl and 1.63 g. of HOOBT (10 mmols) in 30 ml. of methylene chloride. The whole was stirred for 1 hour at 0° C. and for 1 hour at room temperature. The precipitate was filtered off with suction. The filtrate was concentrated and worked-up as described under 2(a). Yield: 4.55 g. (92.4% of the theory); melting point 174–175° C.

EXAMPLE 10

Z-Thr-Phe-OMe 2.2 g. of H-Phe-OMe·HCl and, while stirring, 1.3 ml. of N-ethylmorpholine were added, at room temperature, to a solution of 4 g. of Z-Thr-OOBT (10 mmols) in 30 ml. of tetrahydrofurane. The whole was stirred for 1 hour at room temperature. The solution was then concentrated under reduced pressure and the residue was distributed between ethyl acetate and water. The ethyl acetate phase was extracted by shaking as described under 2(a), dried over sodium sulfate, concentrated and the residue was triturated with petroleum ether. Yield: 3.75 g. (90.5% of the theory); melting point 103–105° C.

EXAMPLE 11

Preparation of Z-Val-Val-OMe (a) With unisolated Z-Val-OOBT: 2.5 g. of Z-Val-OH (10 mmols) and 1.63 g. of HOOBT (10 mmols) were dissolved in 20 ml. of absolute tetrahydrofurane and combined, at 0° C., with a cold solution of 2.2 g. of DCC in absolute tetrahydrofurane. The mixture was allowed to stand for 1 hour at 0° C. and for 1 hour at room temperature; then 1.7 g. of H-Val-OMe·HCl (10 mmols) and 1.28 ml. of N-ethylmorpholine (10 mmols) were added and the whole was stirred for 1 hour at room temperature. Working-up was effected as described under 2(a). Yield 2.9 g. (80% of the theory); melting point 107–109° C.

(b) With unisolated Z-Val-OSu: The reaction mixture was prepared as described in Example 11(a). Instead of HOOBT, 1.25 g. of N-hydroxysuccinimide (11 mmols) were added. Yield 81%; melting point 82–86° C.

EXAMPLE 12

Synthesis of Boc - Leu - Phe-Val-OBu$^t$ [gas-chromatographic racemization test according to F. Weygand et al., Chem. Ber. 99, 1451–1460 (1966)].

The test was so modified that Boc-Leu-Phe-OH was used instead of Z-Leu-Phe-OH, which had the advantage that the completely protected peptide Boc-Leu-L.D-Phe-Val-OBu$^t$ formed could be hydrolyzed without previous splitting off of the protective groups.

(a) Test for racemization according to method (a): 378.5 mg. of Boc-Leu-Phe-OH (1 mmol) and 209.7 mg. of H-Val-OBu$^t$·HCl (1 mmol) were dissolved or suspended in 2 ml. of absolute dimethylformamide or in another solvent. 0.12 ml. of N-ethylmorpholine (1 mmol) was added and the whole was cooled in an ice bath. Then N-hydroxysuccinimide or 3-hydroxy-4-oxo-3,4-dihydro-1,2,3-benzotriazine were added and, finally, a solution of 207 mg. of DCC (1 mmol) in 1 ml. of an absolute solvent which had been cooled to 0° C. The reaction mixtures were allowed to stand for 1 hour at 0° C. and for 1 hour at room temperature, diluted with about 30 ml. of ethyl acetate. The precipitate that had separated was filtered off. The filtrate was shaken with saturated sodium bicarbonate solution, 2 N-citric acid, saturated sodium bicarbonate solution and water, dried over sodium sulfate, concentrated and the residue was chromatographed in ethyl acetate through 3 g. of basic aluminum oxide (Woelm, Activity Degree I). The eluate (about 40 ml.) was concentrated and the residue was dissolved in 5 ml. of 8–9 N-methanolic hydrochloric acid and heated in a bomb tube for 24 hours to 70° C. The methanolic hydrochloric acid was concentrated and the residue was worked-up as described by F. Weygand. The results are shown in the following Table 1.

TABLE 1

Racemization tests in the dicyclohexyl-carbodiimide method with additions of 3-hydroxy-4-oxo-3,4-dihydro-1,2,3-benzotriazine or N-hydroxysuccinimide (Method a).

| Equiv. | Addition | Solvent | Percent D-Phe-L-Val |
|---|---|---|---|
| 0 | No | DMF | 14.3 |
| 0 | No | THF | 8.1 |
| 1 | N-hydroxysuccinimide | DMF | 1.0 |
| 2 | do | DMF | <1.0 |
| 1 | HOOBT | DMF | <1.0 |
| 2 | HOOBT | DMF | 1.3 |
| 1 | HOOBT | THF | <1.0 |
| 1 | HOOBT | Dimethylacetamide | <1.0 |
| 1 | HOOBT | Methylenechloride | <1.0 |
| 1 | HOOBT | DMSO | 1.15 |
| 0 | O | DMSO | 14.9 |
| 1 | HOOBT | Pyridine | 1.5 |
| 0 | O | do | 19.2 |

(b) Test for racemization in the pre-activation of peptides with dicyclohexylcarbodiimide and 3-hydroxy-4-oxo-3,4-dihydro-1,2,3-benzotriazine or N-hydroxysuccinimide: 378.5 mg. of Boc-Leu-Phe-OH (1 mmol) and 3-hydroxy-4-oxo-3,4-dihydro-1,2,3-benzotriazine or N-hydroxysuccinimide were dissolved or suspended in 2 ml. of solvent. The whole was cooled to 0° C. A solution, which had been cooled to 0° C., of 207 mg. of DCC (1 mmol) in 1 ml. of absolute solvent was added while stirring and the whole was stirred for 1 hour at 0° C. and for 1 hour at room temperature. Then 209.7 mg. of M-Val-OBu$^t$·HCl (1 mmol) and 0.12 ml. of N-ethylmorpholine (1 mmol) were added. The whole was again allowed to stand or was stirred for 1 hour at room temperature and worked-up as described under 12(a). The results are compiled in the following Table 2.

TABLE 2

Racemization tests in the pre-activation of peptides with dicyclohexylcarbodiimide and 3-hydroxy-4-oxo-3,4-dihydro-1,2,3-benzotriazine or N-hydroxysuccinimide.

| Equiv. | Addition | Solvent | Percent D-Phe-L-Val |
|---|---|---|---|
| 1 | N-hydroxysuccinimide | DMF | 2.3 |
| 2 | do | DMF | 1.65 |
| 1 | do | Pyridine | 6.1 |
| 2 | do | do | 8.1 |
| 1 | HOOBT | DMF | <1.0 |
| 1 | HOOBT | Dimethylacetamide | <1.0 |
| 1 | HOOBT | THF | <1.0 |
| 1 | HOOBT | Methylenechloride | <1.0 |
| 1 | HOOBT | Pyridine | 1.65 |

Preparation of starting compound Boc-Leu-Phe-OH 38 g. of phenyl-alanine were dissolved in 345 ml. of dioxane and 115 ml. of 2 N sodium hydroxide solution. 38 g. of Boc-Leu-OSu were added and the whole was stirred for 20 hours at room temperature. The precipitate (excess phenyl-alanine) was filtered off with suction and the filtrate was concentrated. The residue was distributed between 200 ml. of ethyl acetate and 220 ml. of 2 N citric acid. The ethyl acetate phase was shaken once again with 2 N citric acid and water, dried over sodium sulfate and concentrated. The residue was saturated with petroleum ether. Yield: 39.3 g.; melting point 108–111° C. After recrystallization from a mixture of ethyl acetate and petroleum ether, the compound was obtained in a yield of 33.3 g.; melting point 112–115° C., $[\alpha]_D^{22} = -8.5°$ (c.=2, methanol).

EXAMPLE 13

Synthesis of TFA-Pro-Val-Pro-OBu$^t$ (gas - chromatographical racemization test according to F. Weygand et al.) [F. Weygand, et al. and Z. Naturf. 23B, 279–281 (1968)]. The test was so modified that the more stable and more easily manipulable H-Pro-OBu$^t$ was used instead of H-Pro-OMe. A further advantage of this modification is the greater sensitivity of the racemization test. For the gas-chromatographic separation, the TFA-Pro-Val-Pro-OBu$^t$ formed was converted into TFA-Pro-Val-Pro-OMe.

(a) Test for the racemization in Method (a): 3-hydroxy - 4 - oxo - 3,4 - dihydro - 1,2,3-benzotriazine or N-hydroxysuccinimide was added to a solution of 309.3 mg. of TFA-Pro-Val-OH (1 mmol) and 171 mg. of H-Pro-OBu$^t$ (1 mmol) in 3 ml. of dimethylformamide and, at 0° C., a solution, which had likewise been cooled to 0° C., of 207 mg. of DCC (1 mmol) in dimethylformamide was added. The whole was allowed to stand for 1 hour at 0° C. and for 1 hour at room temperature. The mixtures were diluted with about 30 ml. of ethyl acetate. The precipitate that had separated was filtered off. The filtrate was extracted with saturated sodium bicarbonate solution, 2 N citric acid, saturated sodium bicarbonate solution and water, dried over sodium sulfate, concentrated, and the residue was chromatographed in ethyl acetate over 3 g. of basic aluminum oxide. (Woelm, activity degree I.) The eluate (about 40 ml.) was concentrated and the residue was dissolved in about 2 ml. of trifluoroacetic acid (90%). The solution was allowed to stand for 1 hour at room temperature, concentrated and the residue was dissolved in ethyl acetate and combined with an ethereal solution of diabomethane until the yellow color remained. The solution was concentrated and gas-chromatographed as described by F. Weygand et al.

The results are shown in the following Table 3.

TABLE 3

Racemization tests in the dicyclohexylcarbodiimide method with additions of 3 - hydroxy - 4-oxo-3,4-dihydro-1,2,3-benzotriazine or N-hydroxysuccinimide (Method a).

| Equiv. | Addition | Solvent | Percent D-Val in the tripeptide |
|---|---|---|---|
| 0 | No | DMF | 67.0 |
| 1 | N-hydroxysuccinimide | DMF | 28.0 |
| 2 | do | DMF | 15.0 |
| 1 | HOOBT | DMF | <1.0 |
| 2 | HOOBT | DMF | <1.0 |

(b) Tests for racemization in the pre-activation of peptides with dicyclohexylcarbodiimide and 3-hydroxy-4-oxo - 3,4 - dihydro - 1,2,3 - benzotriazine or N-hydroxysuccinimide: 309.3 mg. of TFA-Pro-Val-OH (1 mmol) and 3-hydroxy - 4 - oxo - 3,4-dihydro-1,2,3-benzotriazine or N-hydroxysuccinimide were dissolved in 2 ml. of dimethylformamide. The whole was cooled to 0° C. Then a solution of 207 mg. of DCC (1 mmol) in 1 ml. of dimethylformamide, which had been cooled to 0° C., was added and the whole was allowed to stand for 1 hour at 0° C. and for 1 hour at room temperature. Then, a solution of 171 mg. of H-Pro-OBu$^t$ (1 mmol) in 1 ml. of dimethylformamide was added, the whole was allow to stand again for 1 hour at room temperature and worked-up as described under 13(a). The results are given in following Table 4.

TABLE 4

Racemization tests in the pre-activation of TFA-Pro-Val-OH with dicyclohexylcarbodiimide and 3 - hydroxy-4-oxo - 3,4 - dihydro - 1,2,3 - benzotriazine or N-hydroxysuccinimide.

| Equiv. | Addition | Solvent | Percent D-Val in the tripeptide |
|---|---|---|---|
| 1.2 | N-hydroxysuccinimide | DMF | 18.0 |
| 2 | do | DMF | 17.0 |
| 1 | HOOBT | DMF | 1.0 |

EXAMPLE 14

Corticotropin-(1-23)-tricosapeptide-amide 7.5 g. of Boc - Ser - Tyr-Ser-Met-Glu(OBu$^t$)-His-Phe-Arg - Trp - Gly - OH (5 mmols), prepared according to the method described in Chem. Ber. 96, 1080, (1963) were stirred in 100 cc. of dimethylformamide with 815 mg. (5 mmols) of 3 - hydroxy - 4 - oxo-3,4-dihydro-1,2,3-benzotriazine and 1.03 (5 mmols) of 3-dicyclohexyl-carbodiimide for 1 hour at —5° C. and for 1 hour at room temperature. Then, 1.1 g. of H - Lys(Boc) - Pro-Val-Gly-Lys(Boc) - Lys(Boc) - Arg - Arg - Pro - Val-Lys(Boc)-Val - Try - NH$_2$ - triacetate - hexahydrate (5 mmols), prepared according to Chem. Ber. 97, 1197 (1964), which had been dried previously in a high vacuum for 1 hour at 60° C. over P$_2$O$_5$, was added and the mixture was allowed to stand at room temperature. After 4 hours the crude reaction product was precipitated by means of ether. Yield: 19.7 g. The peptide was purified by boiling with peroxide-free tetrahydrofurate. Yield: 17.2 g. The protective groups were split-off in known manner by a 1 hour treatment with 90% trifluoro-acetic acid, the crude tricosa-peptide was precipitated with ether and washed with ether. Yield: 17.0 g. of trifluoroacetate. For further purification, the product was chromatographed in known manner on carboxymethyl cellulose.

We claim:

1. In the method of synthesizing a peptide which comprises reacting:
   (A) a first reagent which is (1) an α-amino acid, in its D- or L-form, found in naturally-occurring peptides, (2) β-alanine, or (3) a peptide built up from these amino acids, said first reagent having a free carboxy group, all other functional groups thereof which require protection being protected; with
   (B) a second reagent which is (1) an α-amino acid, in its D- or L-form, found in naturally-occurring peptides, (2) β-alanine, or (3) a peptide built up from these amino acids, said second reagent having a free amino group, all other functional groups thereof which require protection being protected; in the presence of
   (C) a third reagent which is dicyclohexylcarbodiimide, diisopropylcarbodiimide, or a water-soluble carbodiimide; in an organic solvent at a temperature from —20° C. to 40° C.; the improvement wherein said reagents are reacted in substantially equivalent amounts in the presence of one equivalent of 3-hydroxy -4 - oxo - 3,4 - dihydro - 1,2,3 - benzotriazine.

2. The method of synthesizing a peptide which comprises reacting one equivalent part of (A) a first reagent which is (1) an α-amino acid, in its D- or L-form, found in naturally-occurring peptides, (2) β-alanine, or (3) a peptide built up from these amino acids, said first reagent having a free carboxy group, all other functional groups thereof which require protection being protected; with one equivalent part of
   (B) dicyclohexyl - carbodiimide, diisopropylcarbodiimide, or a water-soluble carbodiimide; and one equivalent part of
   (C) 3 - hydroxy - 4 - oxo-3,4-dihydro-1,2,3-benzotriazine; in an organic solvent at —20° C. to 40° C. to form an ester of said benzotriazine as a reactive intermediate, and then further reacting said reactive intermediate, in an organic solvent at a temperature from —20° C. to 40° C. with one equivalent part of a further reagent
   (D) which is (1) an α-amino acid, in its D- or L-form, found in naturally-occurring peptides, (2) β-alanine, or (3) a peptide built up from these amino acids, said further reagent having a free amino group, all other functional groups thereof which require protection being protected.

3. A method as in claim 1 wherein said carbodiimide is dicyclohexylcarbodiimide.

4. A method as in claim 2 wherein said carbodiimide is dicyclohexylcarbodiimide.

5. A method as in claim 2 wherein said reactive ester intermediate is isolated prior to reaction with said further reagent (D).

(References on following page)

References Cited

UNITED STATES PATENTS

| | | | |
|---|---|---|---|
| 3,317,559 | 5/1967 | Anderson | 260—326.3 |
| 3,396,157 | 8/1968 | Young et al. | 260—112.5 |
| 3,121,707 | 2/1964 | Anderson et al | 260—112.5 |

FOREIGN PATENTS

| | | | |
|---|---|---|---|
| 1,073,500 | 1/1960 | West Germany | 260—112.5 |

OTHER REFERENCES

Paquette: J. Am. Chem. Soc. 87, 5186–5190 (1965).
Zimmerman et al.: J. Am. Chem. Soc. 89, 7151–7152 (1967).
Konig et al.: Chem. Ber. 103, 788–798 (1970).
Konig et al.: Chem. Ber. 103, 2023–2040 (July 1, 1970).

LEWIS GOTTS, Primary Examiner

R. J. SUYAT, Assistant Examiner